(12) United States Patent
Peeters et al.

(10) Patent No.: US 10,536,441 B2
(45) Date of Patent: Jan. 14, 2020

(54) THREAD OWNERSHIP OF KEYS FOR HARDWARE-ACCELERATED CRYPTOGRAPHY

(71) Applicant: Texas Instruments Incorporated, Dallas, TX (US)

(72) Inventors: Eric Thierry Peeters, Frisco, TX (US); Gregory Allen North, Austin, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 423 days.

(21) Appl. No.: 15/244,208

(22) Filed: Aug. 23, 2016

(65) Prior Publication Data

US 2018/0063100 A1 Mar. 1, 2018

(51) Int. Cl.
*G06F 21/74* (2013.01)
*H04L 29/06* (2006.01)

(52) U.S. Cl.
CPC ............ *H04L 63/061* (2013.01); *H04L 63/02* (2013.01)

(58) Field of Classification Search
CPC ........ H04L 63/061; H04L 63/02; G06F 21/70
USPC ....................................................... 713/153
See application file for complete search history.

(56) References Cited

U.S. PATENT DOCUMENTS

| | | | |
|---|---|---|---|
| 7,500,112 B1 | 3/2009 | Wille et al. | |
| 8,494,168 B1 * | 7/2013 | Tolfmans | ............... H04L 9/0894 380/277 |
| 8,867,746 B2 * | 10/2014 | Ceskutti | .................... H04L 9/16 380/277 |
| 2004/0039928 A1 | 2/2004 | Elbe et al. | |
| 2004/0230813 A1 | 11/2004 | Check et al. | |
| 2005/0125684 A1 | 6/2005 | Schmidt | |

(Continued)

FOREIGN PATENT DOCUMENTS

CN   CN101431407 A   5/2009

OTHER PUBLICATIONS

International Search Report and Written Opinion, PCT/US2017/047886, dated Feb. 21, 2018 (7 pages).

(Continued)

*Primary Examiner* — Abu S Sholeman
*Assistant Examiner* — Thanh T Le
(74) *Attorney, Agent, or Firm* — Ebby Abraham; Charles A. Brill; Frank D. Cimino

(57) ABSTRACT

An embedded processor with a cryptographic co-processor operating in a multithreading environment, with inter-thread security for cryptography operations. A secure memory block accessible by the co-processor stores a plurality of key entries, each key entry storing data corresponding to a cryptography key, and a thread owner field that identifies an execution thread is associated with that key. A central processing unit issues a call to the co-processor to execute a cryptography operation along with a key identifier for the key to be used, and a thread identifier indicating the current execution thread. The co-processor compares the thread identifier received from the CPU with the thread owner field of the key entry corresponding to the key identifier. If the thread identifier matches the thread owner in the key entry, the key is retrieved from the secure memory block for use by the co-processor for the cryptography operation.

13 Claims, 5 Drawing Sheets

(56) References Cited

U.S. PATENT DOCUMENTS

| | | | | |
|---|---|---|---|---|
| 2005/0198498 | A1* | 9/2005 | Gaur | H04L 9/0844 713/160 |
| 2008/0155274 | A1* | 6/2008 | Martinez | G06F 12/1483 713/190 |
| 2009/0060197 | A1 | 3/2009 | Taylor et al. | |
| 2009/0292711 | A1* | 11/2009 | Konik | G06F 16/24565 |
| 2009/0296923 | A1* | 12/2009 | Morioka | H04L 9/302 380/28 |
| 2009/0310789 | A1* | 12/2009 | Sie | H04L 63/0823 380/282 |
| 2010/0262883 | A1* | 10/2010 | Arimilli | G06F 9/546 714/748 |
| 2011/0067097 | A1* | 3/2011 | Park | G06F 21/54 726/19 |
| 2013/0238907 | A1* | 9/2013 | Debout | G06F 12/1408 713/193 |
| 2013/0305342 | A1* | 11/2013 | Kottilingal | G06F 21/62 726/11 |
| 2014/0149737 | A1* | 5/2014 | Kulkarni | G06F 9/468 713/156 |
| 2014/0214687 | A1* | 7/2014 | Huxham | H04W 12/0013 705/70 |
| 2016/0381003 | A1* | 12/2016 | Caceres | H04L 63/0823 713/156 |

OTHER PUBLICATIONS

Betancourt et al., "Enable security and amp up chip performance with hardware-accelerated cryptography", White Paper SPRY198 (Texas Instruments Incorporated, 2012).
EP Search Report; Application No./Patent No.: 17844233.1- 1218/ 3504837; PCT/US2017047886; 8 pages.
CN101431407-Machine Translation; 14 pages.

\* cited by examiner

THREAD OWNERSHIP OF KEYS FOR HARDWARE-ACCELERATED CRYPTOGRAPHY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of data security. Embodiments are more specifically directed to computational security within a processor architecture.

Security of data communications is a significant issue for virtually every type of electronic system, ranging from large-scale systems such as supercomputers to the smallest scale systems, such as embedded processors. Indeed, security is becoming the paramount issue for small scale systems such as the sensors and actuators envisioned for deployment in the "Internet of Things" (IoT). These highly distributed IoT objects, which will be implemented in large numbers over a wide range of services and applications, can be particularly vulnerable to attack and compromise, given their relatively small computational capacity and remote implementation. However, the importance of the functions carried out by a network of these sensors and actuators raises the security stakes.

Various approaches are known in the field of digital data cryptography, such as may be used for data communications, data storage and retrieval, and other applications including those that may be carried out by embedded processors. In general, the field of cryptography encompasses data encryption and decryption, digital authentication (e.g., sign/verify schemes), and the like. Public key cryptography, also referred to as asymmetric cryptography, is a commonly used type of cryptography. According to this approach, a public-private pair of "keys", each key being a block of data or information, are generated according to a particular algorithm. The public and private keys have an inverse relationship with one another based on a generator polynomial, such that the transmitting node secures the communication using one of the keys in the pair, and the receiving node decrypts or verifies the communication using the other key. More specifically, in the data encryption context, a block of data that is encrypted using the public key can be decrypted using the private key; in the authentication context, a digital signature generated using the private key can be verified using the public key. The public and private keys are related to one another via a difficult mathematical problem (commonly referred to as a "trap-door function"), so that it is computationally difficult to determine a private key from knowledge of its corresponding known public key. The public key can thus be published, for example sent by an unsecured communication or listed in a public registry, to enable data communication data between the holder of the private key and those obtaining the public key, without realistic risk that the private key can be calculated by an attacker. The public/private key approach is generally favored because the holder of the private key need not share that key with any other party; in contrast, symmetric key approaches require both parties to know the same encryption key.

The level of security provided by a particular public key scheme corresponds generally to the length of the keys; longer key lengths increase the difficulty of deriving the private key from the public key. Conventional bit lengths for both public and private keys under such cryptography algorithms as "DH", "DSA", and "RSA", range from on the order of 1024 bits to 15360 bits. Of course, the lengths of the keys can vary widely, depending on the desired security level and the available computational capacity of the encrypting and decrypting nodes. More specifically, increasing the level of security implemented in an electronic system generally comes at a cost of reduced system performance because of the increased number of machine cycles and increased memory space required for the longer keys associated with the higher security level.

This tradeoff can be relieved to a significant extent by the implementation of a hardware-based accelerator dedicated to cryptographic processing in the system processor. The SITARA AM335x processors available from Texas Instruments Incorporated are examples of embedded processors in which such dedicated hardware-based security accelerators are implemented, such as may be used in IoT applications. In this type of architecture, the computationally intensive operations involved in encrypting, decrypting, and other cryptography functions are offloaded by the central processing unit to the security accelerator. This allows the central processing unit to utilize its processing bandwidth on processing the end-user application, so that the system throughput is not significantly affected by the cryptography operations.

FIG. 1 illustrates the generalized functional architecture and operation of an example of a conventional embedded processor with a hardware-based security accelerator. In this example, central processing unit (CPU) 2 is a conventional multiple-core processor, such as an ARM CORTEX-A8 CPU as used in the SITARA AM335x processors noted above. CPU 2 executes its applications in a multi-threading environment under a conventional operating system, such as LINUX. In the example of FIG. 1, CPU 2 is running three threads T1, T2, T3 under operating system 4. As conventional in the art, the various threads T1, T2, T3 are executed by CPU 2 according to a scheduler function in operating system 4, with operating system 4 writing an identifier of the current thread being executed in thread ID register 9 of CPU 2 as shown in FIG. 1. This thread ID is managed by the hardware of CPU 2 under control of operating system 4, to prevent impersonation of one thread by another.

The conventional processor of FIG. 1 includes cryptographic co-processor 5, which operates as a hardware-based security accelerator in communication with CPU 2 over a bus SYS_BUS, and that is dedicated to the execution cryptography operations such as encrypting and decrypting of data blocks. In this architecture, cryptographic co-processor 5 carries out these operations in conjunction with secure memory block 6, which is a portion or all of a memory resource accessible to co-processor 5 via dedicated bus DED_BUS; typically, access to secure memory block 6 is restricted to co-processor 5, to the exclusion of CPU 2 and other general purpose logic and I/O functions in the embedded processor.

In this conventional architecture, cryptographic co-processor 5 and secure memory block 6 serves as a shared resource common to the various threads T1 through T3 being executed by CPU 2. As known in the art, the switching of execution from one thread to another as is often performed in a multithreading environment requires the storing of the execution "context" from the thread being paused, for later retrieval upon resumption of the execution of that thread. This context includes register contents, execution states, settings, and other information that can allow the logic circuitry to resume execution of the thread in the same place at which it left off, as though the intervening thread or threads had not handled in the meanwhile. For cryptography operations, this context includes the cryptography key being used in a particular thread. Secure memory block 6 in this conventional architecture allows fast context switching by co-processor 5 upon receiving a command to execute a cryptography operation under a different execution thread from a previous operation, by providing local storage of the cryptography context, specifically the keys used in cryptography operations by co-processor 5.

As shown in FIG. 1, multiple key entries 8 are available in secure memory block 6 for storing a number of cryptography keys (i.e., multiple thread contexts), thus allowing co-processor to execute a number of different operations and communication channels, each having their own distinct private, public, or symmetric (shared) key. In this typical conventional arrangement, each key entry $8_x$ can be called by a key "tag" or other identifier KEY ID by way of which a particular key can be identified and referred to. The contents of entries 8 each include a KEY field for storing the key itself, or for storing an address pointer referring to another location in secure memory block 6 at which the key is stored. In some conventional architectures, a KEY ATTR field indicating the type of cryptography operations (i.e., encryption, decryption, authentication, signing) for which that key is permitted to be used, as well as the cryptography type (AES, PKA, etc.) of that key. Four key entries $8_1$ through $8_4$ are shown in FIG. 1, although secure memory block 6 may of course contain more or fewer entries as appropriate.

In this architecture, CPU 2 communicates with cryptographic co-processor 5 by way of bus SYS_BUS. To invoke a cryptography operation in the current execution thread, CPU 2 issues a call to co-processor 5 over bus SYS_BUS, including a command indicating the type of operation to be performed, the data on which those operations are to be performed, and a value of the key identifier KEY ID indicating the key entry $8_x$ for the cryptography key to be used in that operation. If that key differs from the key currently being used by co-processor 5, which typically occurs if operating system 4 has switched execution from one thread to another at CPU 2, co-processor 5 carries out a context switch by storing the current key and other context at the key entry $8_x$ in secure memory block 6 for that prior key, and retrieving the key for the key entry $8_x$ corresponding to the newly-received KEY ID value from CPU 2. Upon completion of the desired cryptography operation, cryptographic co-processor 5 communicates the results back to CPU 2 over bus SYS_BUS.

By way of further background, conventional processor architectures are known in the art in which the cryptographic co-processor can operate in either a "public" or a "private" mode. In these architectures, the public mode may be associated with one cryptography key that can be shared among multiple threads in this mode, while the private mode is associated with a different cryptography key that can also be shared among threads in that mode.

By way of further background, conventional processor architectures known in the art carry out context switching outside of the cryptographic co-processor. In these architectures, the operating system carries out a context switch at the CPU or other processor calling the co-processor, "cleaning up" the context of the previous thread to the extent present in the co-processor. In this approach, the co-processor is not involved in the context switch other than by having its key rewritten, if desired, by the next thread.

By way of further background, in some conventional processor architectures, separate registers for public and private modes are provided in the cryptographic co-processor. These logically separated registers isolate cryptography keys and other settings and information that are used by the co-processor in the private domain from that used in the public domain, and vice versa. In this arrangement, cleanup is not required in a context switch from one domain to the other.

BRIEF SUMMARY OF THE INVENTION

Disclosed embodiments provide a processor and method of operating the same in which cryptography operations are performed at a hardware-based security accelerator in a multithreading environment at a higher level of security, without degrading system performance.

Disclosed embodiments provide such a processor and method that provides improved isolation among threads, for purposes of cryptographic operations.

Disclosed embodiments provide such a processor and method in which fast context switches at the security accelerator.

Other objects and advantages of the disclosed embodiments will be apparent to those of ordinary skill in the art having reference to the following specification together with its drawings.

Embodiments may be implemented in a processor architecture in which a central processing unit (CPU) operating in a multithreading environment issues calls to a cryptographic co-processor to execute cryptography operations such as encryption and decryption, using a key. A secure memory block accessible by the co-processor stores a plurality of key entries, each key entry storing a cryptography key associated with a thread identifier that identifies the execution thread is associated with ("owns") that key. On issuing a co-processor call for a cryptography operation, the CPU communicates a key identifier for the key to be used, and a thread identifier to the co-processor. The co-processor compares the thread identifier received from the CPU with the thread identifier stored in the secure memory with the desired key to determine whether the calling thread owns that key; if so, the key is retrieved from the secure memory block for use by the co-processor for the cryptography operation. If the thread identifiers do not match, the requested operation is not performed.

DETAILED DESCRIPTION OF THE INVENTION

The one or more embodiments described in this specification are implemented into an embedded processor, for example a microcontroller, in an electronic system, as it is contemplated that such implementation is particularly advantageous in that context. However, it is also contemplated that concepts of this invention may be beneficially applied in other applications, for example larger-scale processors and systems, including smartphones, tablet computers, notebook and other personal computers, servers, and the like. Accordingly, it is to be understood that the following description is provided by way of example only, and is not intended to limit the true scope of this invention as claimed.

Figure 1:
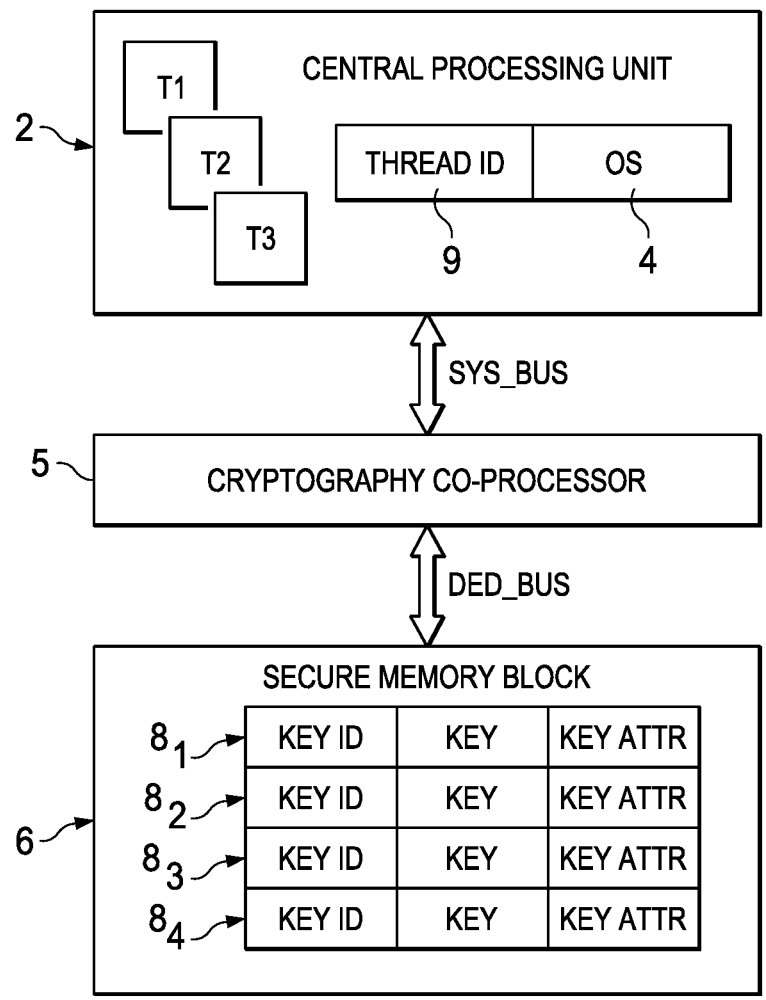
FIG. 1 is an electrical diagram, in block form, of a portion of the architecture of a conventional embedded processor.

It has been discovered, according to this invention, that conventional embedded processors can be vulnerable to an "attack" in connection with its cryptography operations as performed by a cryptographic co-processor. For example, referring to the conventional architecture described above relative to FIG. 1, a first execution thread may issue a call to co-processor 5 to encrypt a block of data using a first key. Following a context switch, that first key is stored in secure memory block 6, which locally stores the context data for the cryptography operations for a number of CPU threads. In this type of attack, malicious software executing in a different thread monitors the bus SYS_BUS between CPU 2 and co-processor 5 to obtain the encrypted data, and then issues a call to co-processor 5 to decrypt that block of data using the first key now stored in secure memory block 6, which is the key with which the data were encrypted. In short, the conventional co-processor architecture described above relative to FIG. 1 does not provide security for cryptography keys between threads.

According to these embodiments, this vulnerability is precluded by binding each key entry in the secure memory of a co-processor system to a specific thread. In an embodiment, the key entry includes a field identifying the thread "owns" the key associated with that key entry, which is the thread that provisioned the co-processor with that key. In order for the key to be accessed by the co-processor, the thread calling the co-processor to use that key in an operation must match the thread owner identified in the key entry for the key.

Figure 2:
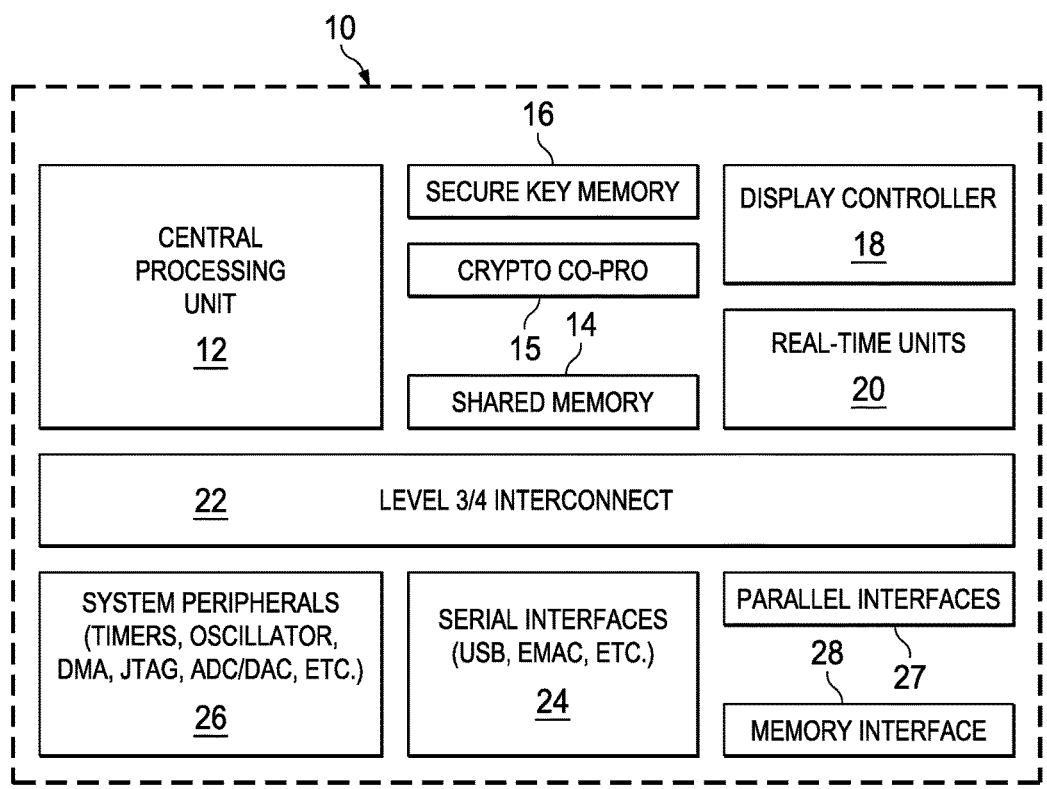
FIG. 2 is an electrical diagram, in block form, of an embedded processor constructed according to the embodiments.

FIG. 2 illustrates the overall architecture of embedded processor 10 according to these embodiments, such as may be implemented into a sensor, controller, or other electronic system suitable for deployment in the IoT context. Of course, as mentioned above, these embodiments may be implemented in processor circuitry of various architectures as deployed in electronic systems of varying scale and for a wide range of applications. The architecture of embedded processor 10 in this embodiment follows the overall architecture of such devices as the SITARA AM335x ARM processors available from Texas Instruments Incorporated, but is additionally constructed according to one of the embodiments described below. It is contemplated that processor 10 according to this architecture will typically be realized as a single integrated circuit, but of course may alternatively be realized as multiple integrated circuits (e.g., as a "chipset" or multi-module device). In addition, it is contemplated that more or fewer functional units other than those described herein may be included in processor 10 according to these embodiments.

As evident from FIG. 2, a number of different functional units are included within processor 10; bus connections are not shown in FIG. 2 for clarity. Central processing unit (CPU) 12 serves as the main programmable logic of processor 10, and may be a multi-core processor such as an ARM CORTEX-A8 or the like, as in the SITARA AM335x processor family noted above. In this embodiment, CPU 12 is suitable for executing its application programs and the like in a multithreading environment, as known in the art for modern multi-core processors. CPU 12 operates in connection with system memory 14, for example via a main system bus (not shown). System memory 14 includes the appropriate program and data memory useful to CPU 12 and other functions in processor 10, and may be realized as multiple blocks or arrays of memory of different types, including volatile memory such as SRAM and also non-volatile memory such as EEPROM or flash memory.

Other functional units provided in processor 10 according to this embodiment include display controller 18, which may include or cooperate with a graphics co-processor (not shown) within processor 10, and various programmable real-time units 20, which support communication between processor 10 and other devices in the IoT over one or more conventional protocol such as the EtherCAT, PROFIBUS, PROFINET, and EtherNet/IP protocols, and the like. Processor 10 includes additional interfaces that are accessible to CPU 12 via level 3/4 interconnect bus 22, including serial interfaces 24 (e.g., USB and EMAC interfaces), parallel interfaces 26 (e.g., SDIO and GPIO interfaces), and memory interface 28 such as may be used to interface with DRAM or other memory external to processor 10. A wide variety of system peripherals 26 may also be included within processor 10, such as timers, oscillators, DMA functions, analog-to-digital (ADC) and digital-to-analog (DAC) converters, and the like.

According to these embodiments, processor 10 is capable of securely executing various cryptography operations, including such operations as data encryption, data decryption, authentication, and the like. These cryptography operations are typically quite computationally intensive, consuming a large number of processor cycles and significant memory resources. To improve its overall performance and bandwidth, specifically as relating to its CPU 12, processor 10 according to this embodiment includes cryptographic co-processor 15, which is a programmable logic function such as a processor core that is dedicated to executing software routines for cryptography operations. In this architecture, co-processor 15 operates in conjunction with secure key memory 16. As will be described in further detail below, secure key memory 16 includes the appropriate memory space and organization for storing cryptography keys used in the execution of cryptography operations by co-processor 15. Secure key memory 16 is considered as "secure" memory in the sense that access to it may be restricted to co-processor 15, and perhaps other specific circuit functions in processor 10, to the exclusion of other circuit functions. In this sense, secure key memory 16 may be physically separate from system memory 14 and other memory resources in processor 10, with a dedicated memory bus running between it and co-processor 15, or alternatively may be realized as part of system memory 14 to which access is restricted by a "firewall" or other security operation. In addition to secure key memory 16, program memory storing the cryptography software routines and other program code executable by co-processor 15 is provided in processor 10;

this program memory may be a portion of secure key memory 16, or a portion of system memory 14, or alternatively may be another memory resource within or accessible to co-processor 15.

It is contemplated that those skilled in the art having reference to this specification will be readily able to realize the embodiments described in this specification in this and other alternative processor architectures, as suitable for a particular application, without undue experimentation.

Figure 3:
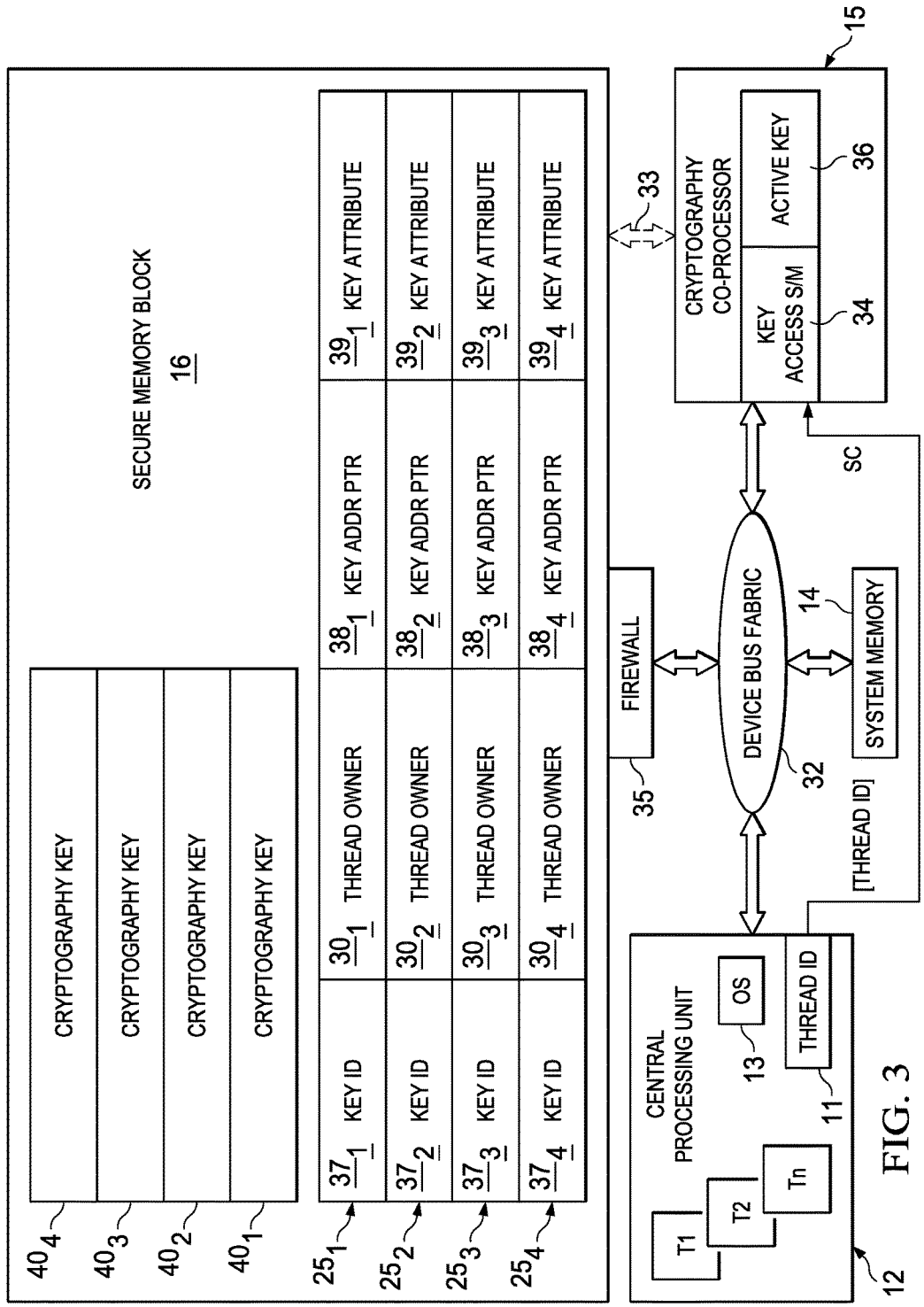
FIG. 3 is an electrical diagram, in block form, of the architecture of the central processing unit, cryptographic co-processor, and secure memory block of the processor of FIG. 2 according to an embodiment.

Referring now to FIG. 3, the architecture of processor 10 as it pertains to the operation of cryptographic co-processor 15 according to an embodiment will now be described. As described above, CPU 12 in this embodiment is a multi-core processor supporting operating system 13, and capable of operating in a multithreading environment, running n threads T1 through Tn in the instance shown in FIG. 3. CPU 12 includes thread ID register 11, which stores an identifier of the current thread being executed by CPU 12. This thread identifier may take various forms, depending on the implementation. For example, in a multi-core architecture, the thread identifier may be composed of a label assigned to each of the execution threads regardless of the core executing that thread, or alternatively may be composed of an identifier of the CPU core executing that thread in combination with a thread identifier distinguishing among the threads on that core. Regardless of the form of the thread ID, operating system 13 controls the scheduling and switching of the various execution threads T1 through Tn as typical in the art, and itself writes the contents of thread ID register 11 with the current thread identifier. In this embodiment, operating system 13 has a higher privilege level than other software routines such as application software, so that operating system 13 is capable of writing the contents of thread ID register 11 to the exclusion of the lower privilege software routines. This "hardware" setting of the current thread and thread ID register 11 prevents one thread from "impersonating" another in this multithreading environment.

In this embodiment, CPU 12 is coupled to and communicates with co-processor 15 via the main device bus fabric 32 of processor 10. Device bus fabric 32 includes the appropriate conductors for communicating memory addresses, data, and control information among the various functions of processor 10, including system memory 14 and other functions of processor 10 such as are described above relative to FIG. 3.

In addition to device bus fabric 32, CPU 12 is also coupled to cryptographic co-processor 15 by way of "sideband" signals. In these embodiments, side-band signals refer to data and control information signals communicated from CPU 12 to co-processor 15 over hardware communication path ("side-band path") SC separate from device bus fabric 32. For example, side-band path SC can be realized by one or more conductors, in the integrated circuit implementing processor 10, that are separate from device bus fabric 32 and thus that cannot be accessed by a function residing on device bus fabric 32. As such, side-band signals transmitted over side-band path SC will not be visible or otherwise cannot be comprehended by a circuit or function "snooping" device bus fabric 32. In this embodiment, these side-band signals securely communicate the contents of thread ID register 11, namely the identifier of the thread currently being executed by CPU 12, from CPU 12 to co-processor 15 in connection with a call for a cryptography operation.

In this embodiment, co-processor 15 includes functional circuitry useful in its execution of a cryptography operation in response to a call from CPU 12 over device bus fabric 32 and side-band path SC. This functional circuitry includes key access state machine 34, which is sequential logic implemented in co-processor 15 to communicate with secure memory block 16 to retrieve a cryptography key associated with the task called by CPU 12. Co-processor 15 also includes active key store 36, which is a memory block or register location for storing the cryptography key retrieved by state machine 34 from secure memory block 16. In this embodiment, key access state machine 34 retrieves cryptography keys from secure memory block 16 over the main device bus fabric 32 of processor 10. For its part, secure memory block 16 interfaces with device bus fabric 32 via firewall 35, which is constituted by logic circuitry that restricts access to those portions of secure memory block 16 storing the cryptography keys and related information to only cryptographic co-processor 15, to the exclusion of other functions during the normal operation of processor 10. In some embodiments, firewall 35 may be arranged to allow other functions, such as CPU 12 itself, to also access secure memory block 16 within the confines of a "secure" process. For example, a secure process may be executed by CPU 12 to load secure memory block 16 with the cryptography keys.

Alternatively, co-processor 15 may be coupled to secure memory block 16 via a dedicated bus, such as suggested in FIG. 3 by bus 33, shown in shadow. In this alternative approach, secure memory block 16 may not be coupled to device bus fabric 32, in which case it can only be accessed by or through cryptographic co-processor 15. It is contemplated that this alternative structure may be useful in those applications in which secure memory block 16 is dedicated only to key storage, and contains no other memory space available for other secure functions.

In this embodiment, all or a portion of secure memory block 16 serves as dedicated key storage management memory for cryptographic co-processor 15. As shown in FIG. 3, a region of secure memory block 16 stores a number of cryptography keys $40_1$ through $40_4$ (collectively, keys 40) for use by co-processor 15 in cryptography operations called by CPU 12. These cryptography keys 40 may be of different types and sizes from one another. For example, keys $40_1$ and $40_4$ may each be an AES 128 key, key $40_2$ may be a PKA key, and key $40_3$ may be an AES 256 key. Especially because of the relatively large size and varying key types and sizes, these keys 40 are accessed by way of indirect addressing, as will be described below.

In this embodiment, secure memory block 16 includes a region at which a number of key entries $25_1$ through $25_4$ (collectively, entries 25) are stored. Of course, while four key entries $25_1$ through $25_4$ are shown in FIG. 3 for this example, secure memory block 16 may of course contain more or fewer key entries 25 as appropriate. In this regard, each key entry $25_x$ includes a number of fields pertaining to a corresponding cryptography key $40_x$. For purposes of the indirect accessing of keys 40 as described above, each key entry $25_x$ in this embodiment is a key address pointer field $38_x$, which stores the memory address in secure memory block 16 at which its corresponding key $40_x$ is stored. Alternatively to the indirect addressing arrangement shown in FIG. 3, a field in each entry $25_x$ may store the actual key $40_x$ itself, for example in place of key address pointer field $38_x$; this arrangement may be suitable for short keys of a similar type and size. Also as shown in FIG. 3, each key entry $25_x$ includes a key attribute field $39_x$ that identifies the cryptography type of its corresponding key $40_x$ (e.g., PKA, AES, etc.), and may also include permissions such as the type of operations for which that key $40_x$ may be used (encryption/decryption, signing/authentication, etc.), among others.

According to this embodiment, each key entry $25_x$ is associated with a tag or identifier, shown in FIG. 3 as key identifier field $37_x$, by way of which co-processor 15 accesses that particular key entry $25_x$. For example, the call to co-processor 15 by CPU 12 may include a key identifier value corresponding to the contents of the key identifier field $37_x$ corresponding to the cryptography key $40_x$ to be used in that operation. Key access state machine 34 receiving this key identifier value from CPU 12 may then access the key entry $25_x$ in secure memory block 16 with that value, in a manner similarly to a content-addressable memory or cache tag array, to retrieve the key address pointer $38_x$ for the corresponding key $40_x$. Alternatively, key access state machine 34 may retrieve the key $40_x$ from secure memory block 16 using a memory address, for example by using a look-up table to translate the key identifier value communicated by CPU 12 to the memory address for the corresponding key entry $25_x$ in secure memory block 16.

According to this embodiment, each key entry $25_x$ includes a thread owner field $30_x$. Thread owner field $30_x$ stores a thread identifier value that identifies the one of threads T1 through Tn at CPU 12 that "owns" the cryptography key $40_x$ associated with that key entry $25_x$. More specifically, it is contemplated that the contents of this thread owner field $30_x$ are a thread identifier for the execution thread that originally provided that cryptography key $40_x$ to co-processor 15, and thus the thread for which key $40_x$ is associated and is stored in secure memory block 16 in connection with a context switch. These thread identifier values are assigned by operating system 13 as execution threads are established at CPU 12, and stored in thread ID register 11 of CPU 12 as the current thread during execution, as typical for conventional processors operating in multi-threading environments. Other criteria or operations may determine which CPU thread is considered to "own" that particular key.

Figure 4:
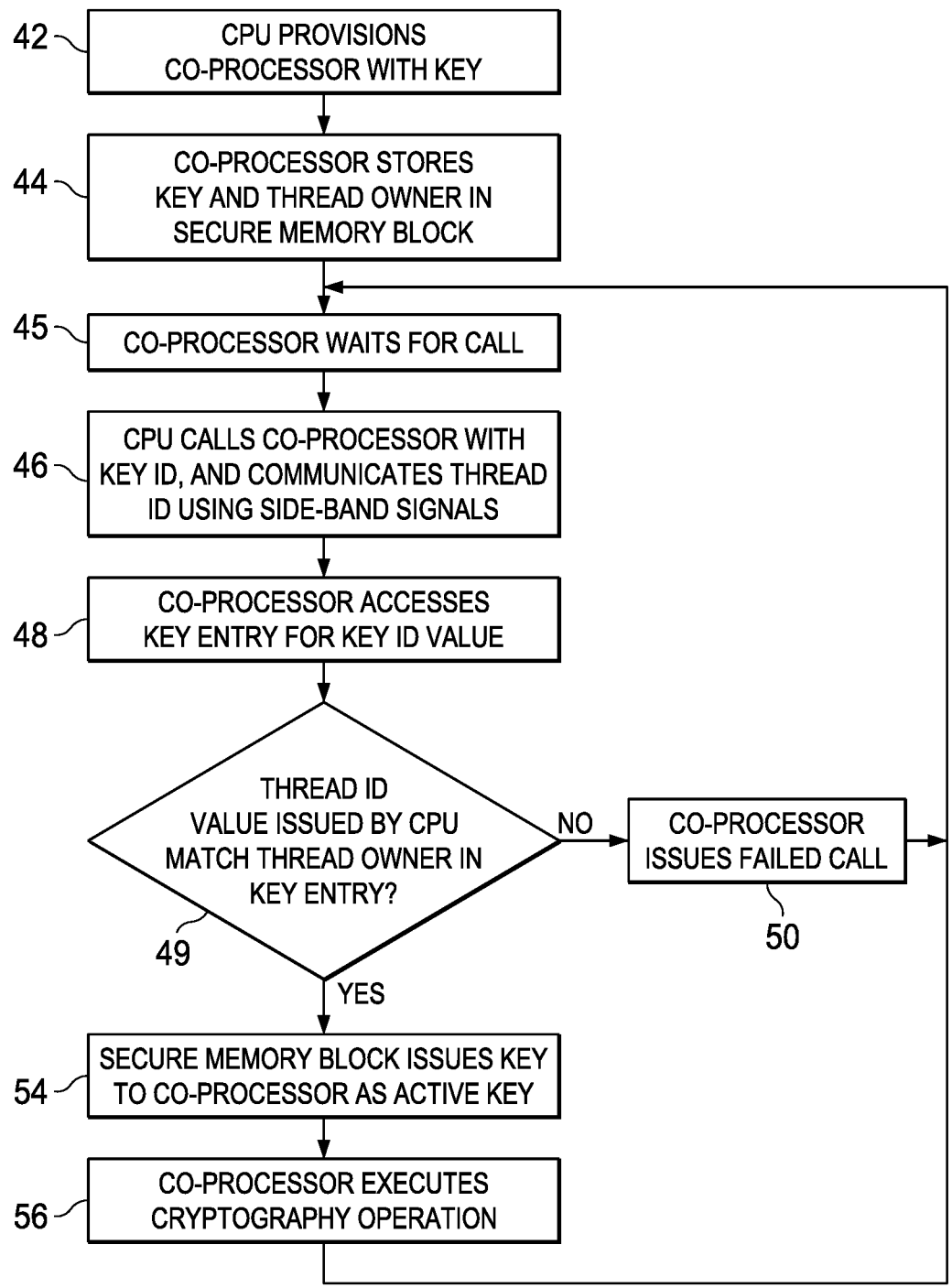
FIG. 4 is a flow diagram illustrating the operation of the architecture of FIG. 3 according to that embodiment.

Referring now to FIG. 4, the execution of a cryptography operation in processor 10 according to an embodiment will now be described. In process 42, co-processor 15 and secure memory block 16 are "provisioned" with one or more cryptography keys by CPU 12. For example, a current thread (e.g., thread T1) being executed by CPU 12 may include a "store key" instruction, by way of which a cryptography key is forwarded by CPU 12 to co-processor 15 over device bus fabric 32, along with the thread ID for this current thread T1 over side-band path SC. Provisioning process 42 may alternatively be performed by CPU 12 issuing a command for a cryptography operation (e.g., encrypt a block of data) to be performed by co-processor 15 using a particular key. In either case, the relevant command, along with the key to be used and data on which the operation is to be performed are forwarded by CPU 12 over device bus fabric 32, and the thread ID (e.g., T1) for the current execution thread is forwarded by CPU 12 over side-band path SC. In process 44, co-processor 15 stores the key in secure memory block 16. This process 44 may be performed at the time of a context switch at co-processor 15 (a different thread, e.g. thread T3, calling a cryptography operation), or as an immediate response to an explicit "store key" instruction. For the memory arrangement shown in FIG. 3, the memory write of process 44 will include the creation of an entry $25_x$ with reference to a key identifier (field $37_x$) and the appropriate attributes in field $39_x$, the storing of the key $40_x$ itself at a memory address that is stored in key address pointer $38_x$, and the storing of the thread ID value for the current thread provisioning this key in the thread owner field $30_x$ of this key entry $25_x$. In the architecture of processor 10 of FIG. 3, these memory write operations will be carried out by key access state machine 34 via device bus fabric 32 to secure memory block 16, permitted by firewall 35.

This provisioning process 42 and storing process 44 may be repeated as desired by CPU 12 in setting up a number of cryptography keys in secure memory block 16 for later use by co-processor 15. More typically, however, it is contemplated that these processes 42, 44 will be performed as and when needed in the normal program flow of the application programs being executed by processor 10, rather than in a set of key provisioning operations. In any case, following the storing of a key in process 44, co-processor 15 then enters a wait state in process 45, awaiting a command from CPU 12.

In process 46, CPU 12 issues a call to co-processor 15 to execute a cryptography operation. In the architecture of FIG. 3, this call may be issued as a command corresponding to the desired cryptography operation, along with the data on which the operation is to be performed (or, for example, the address in system memory 14 at which the data are stored), and a key identifier value indicating which cryptography key stored in secure memory block 16 is to be used. This key identifier value may be the tag corresponding to the key identifier $37_x$ by way of which key access state machine 34 of co-processor 15 may access the corresponding entry $25_x$ in secure memory block 16 to retrieve the corresponding key $40_x$, or alternatively may be a value that state machine 34 translates to arrive at the key identifier $37_x$. As described above, CPU 12 forwards the command, the data (or address), and the key identifier value to co-processor 15 over device bus fabric 32. Also in process 46, according to this embodiment, CPU 12 also forwards the current thread identifier stored in its thread ID register 11 to key access state machine 34 by way of side-band signals communicated over path SC. As described above, the thread ID of the current execution thread is stored in thread ID register 11 under operating system 13, for example as it carries out a context switch, and is also communicated "in hardware" over side-band path SC by operating system 13. The writing of thread ID register 11 and the communication of its contents over side-band path may be restricted to the high privilege level of operating system 13, to the exclusion of lower-privilege processes such as application software, to prevent malicious application software code being executed in one thread from impersonating another thread. Accordingly, the thread ID communicated with the command and key identifier in process 46 is contemplated to identify the true current execution thread then being executed at CPU 12.

In process 48, key access state machine 34 in CPU 12 according to this architecture accesses the key entry $25_x$ to which the key identifier value communicated by CPU 12 in this instance of process 46 corresponds, in response to which secure memory block 16 returns the contents of thread owner field $30_x$ for that key entry $25_x$ to state machine 34. State machine 34 then executes decision 49 by comparing the retrieved contents of thread owner field $30_x$ from key entry $25_x$ with the thread ID value communicated by CPU 12 over side channel 34 in process 46. This comparison of decision 49 compares the thread ID of the current execution thread issuing the call to use a particular key $40_x$ with the thread ID of the execution thread that originally provisioned co-processor 15 with that key $40_x$, i.e., the thread that is the "owner" of that key $40_x$. If the thread ID value from CPU 12 over side-band path SC does not match the contents of the thread owner field $30_x$ in the accessed key entry $25_x$ (i.e., decision 49 returns a "no" result), state machine 34 issues an error message over device bus fabric 32 in process 50, indicating to CPU 12 that its call to co-processor 15 failed because the current thread does not have permission to use the cryptography key identified by the key identifier in process 46. Control then passes to wait state 45 to await the next call to co-processor 15.

If the thread ID communicated over side-band path SC to state machine 34 matches the contents of the thread owner field $30_x$ in the key entry $25_x$ retrieved from secure memory block 16 in process 48 (decision 49 returns a "yes" result), the cryptography operation called in process 46 may proceed. In process 54, state machine 34 retrieves the actual key $40_x$ by accessing the memory address in secure memory block 16 stored in the key address pointer field $38_x$ of the key entry $25_x$, or by reading the corresponding field of key entry $25_x$ if key $40_x$ is stored within the key entry $25_x$ itself, and stores the key $40_x$ in active key store 36 of co-processor 15. Permissions in the key attribute field $39_x$ of the retrieved key entry $25_x$ may also be checked to ensure that the key $40_x$ can be used for this particular operation. Assuming so, that stored key $40_x$ is then used by co-processor 15 in executing the desired cryptography operation in process 56. Once that operation of process 56 is completed and the results forwarded back to CPU 12, co-processor 15 returns to wait state 45 to await the next call.

According to this embodiment, therefore, access to the cryptography key used in one execution thread in a multi-threading environment may be restricted from use by other execution threads. Binding of keys to individual threads in this manner allows for greater security in processor-based systems that include a cryptographic co-processor, including those contemplated for implementation in the IoT context for which security is a major concern, by precluding an attack by malicious software executing in a separate thread. This improved security is attained in a manner that permits fast context switches at the cryptographic co-processor, relieving the main processor logic from managing the co-processor context switch and from accessing external memory and thus degrade overall system performance.

Figure 5:
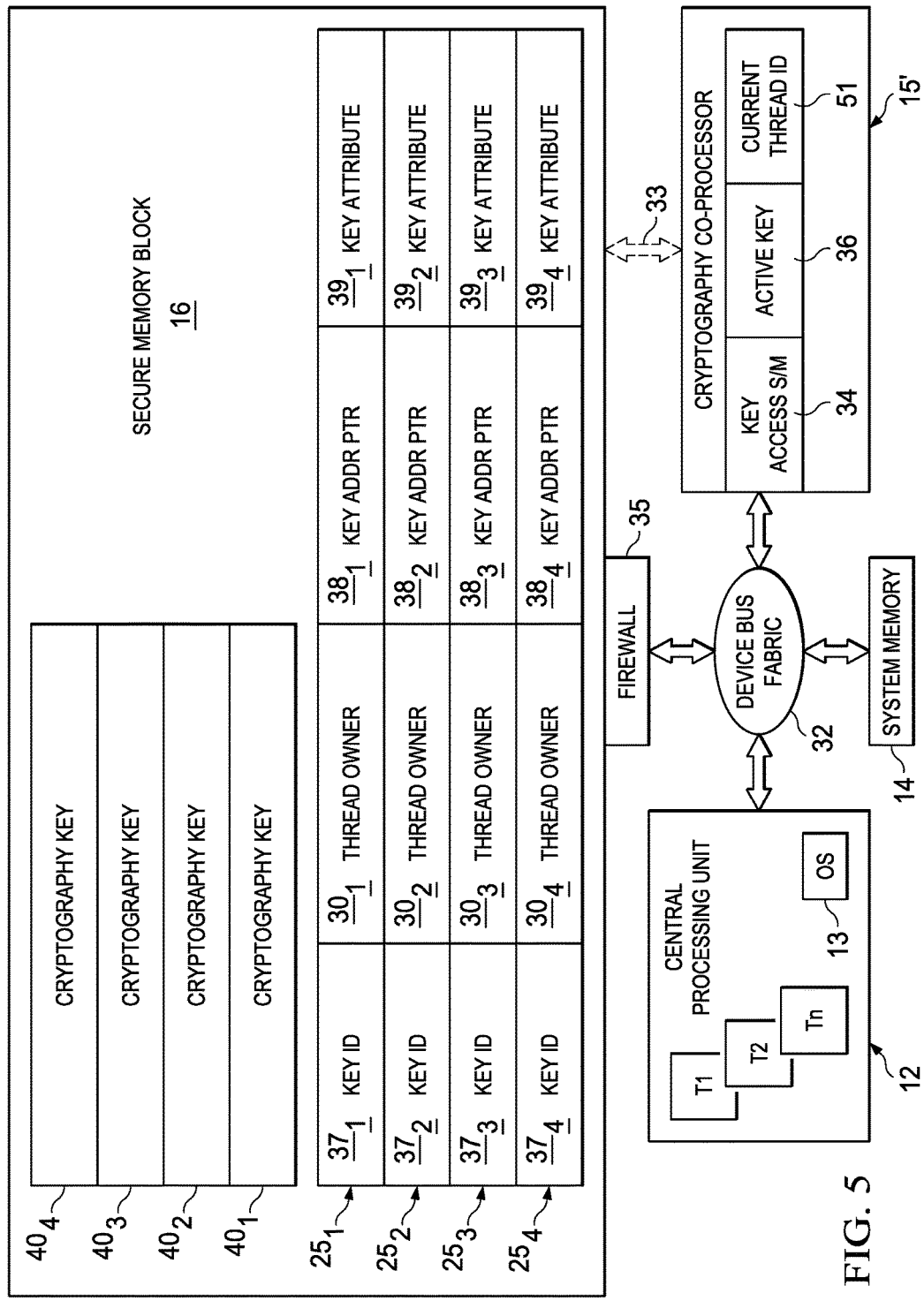
FIG. 5 is an electrical diagram, in block form, of the architecture of the central processing unit, cryptographic co-processor, and secure memory block of the processor of FIG. 2 according to another embodiment.

As described for the embodiment shown in FIG. 3, the thread ID for the execution thread issuing the call to co-processor 15 is communicated from thread ID register 11 in CPU 12 to co-processor 15 over side-band path SC. According to another embodiment, as shown in FIG. 5, current thread ID register 51 is provided within cryptographic co-processor 15'. In this embodiment, operating system 13 causes CPU 12 to forward the current thread ID value to co-processor 15' over device bus fabric 32, for example as part of a thread context switch carried out at CPU 12, even if co-processor 15' is not involved in the software routine. As in the embodiment of FIG. 3, it is contemplated that operating system 13 will have a sufficiently high privilege level, higher than that of other software routines such as the application software being executed, so that it can write the contents of current thread ID register 51, while lower privilege software routines are prohibited from doing so. According to this embodiment, therefore, the current thread ID is stored in register 51 at co-processor 15' itself. In operation, the comparison in decision 49 (FIG. 4) to determine whether the current execution thread is the owner of the indicated cryptography key $40_x$ is performed by key access state machine 34 by comparing the contents of its own thread ID register 51 with the contents of the thread owner field $30_x$ of the retrieved key entry $25_x$. The operation of co-processor 15' according to this embodiment of FIG. 5 otherwise follows the method described above relative to FIG. 4.

Further in the alternative, the contents of the key entry may be arranged so that threads other than the thread that provisioned (i.e., "owns") a particular cryptography key can be authorized to also use the same key. In this alternative implementation, decision 49 of FIG. 4 would evaluate a corresponding field of the key entry to determine whether the current execution thread as communicated by CPU 12 or as stored in co-processor 15 itself by operating system 13 is authorized to use that key; if not, the error message would be issued, and if so, the desired operation would be executed within that current thread.

While one or more embodiments have been described in this specification, it is of course contemplated that modifications of, and alternatives to, these embodiments, such modifications and alternatives capable of obtaining one or more the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A processor, comprising:
   a central processing unit;
   a first bus coupled to the central processing unit;
   a side-band communication path coupled to the central processing unit, the side-band communication path is separate from the first bus;
   a memory for storing a plurality of key entries, each key entry associated with a respective key identifier, a respective thread owner, and a respective cryptography key; and
   a processor, coupled to the central processing unit and the memory, the processor is coupled to the central processing unit via the first bus and the side-band communication path, and the processor comprises logic circuitry adapted to execute a plurality of operations comprising:
      receiving a key identifier value from the central processing unit over the first bus;
      receiving a thread identifier value from the central processing unit over the side-band communication path;
      retrieving a key entry in the memory corresponding to the received key identifier value and the thread owner associated with the retrieved key entry; and
      responsive to the thread identifier value corresponding to the thread owner associated with the accessed key entry, executing a cryptography operation using the cryptography key associated with the accessed key entry.

2. The processor of claim 1, wherein the central processing unit comprises: programmable logic; and a thread ID register for storing the thread identifier value indicating the a current thread being executed by the programmable logic.

3. The processor of claim 1, wherein the processor further comprises:
   a thread ID register for storing the thread identifier value indicating a current thread being executed by the central processing unit;
   wherein the central processing unit communicates the thread identifier value to the processor over the first bus.

4. The processor of claim 1, wherein the memory is coupled to the processor via the first bus;

and further comprising:
a firewall function restricting access to the memory on a channel coupling the processor to the memory.

5. The processor of claim 1, further comprising:
a second bus coupling the processor to the memory.

6. The processor of claim 1, wherein the central processing unit, the memory, and the processor are in a single integrated circuit.

7. The processor of claim 1, wherein the central processing unit comprises a plurality of processor cores;
and wherein the thread identifier value corresponds to one of the plurality of processor cores executing the current thread.

8. A method comprising:
storing, in a memory, a plurality of key entries, each key entry associated with a respective key identifier, a respective thread owner, and a respective cryptography key;
receiving, by a processor from a central processing unit, a key identifier value over a first bus;
receiving, by the processor from the central processing unit, a thread identifier value over a side-band communication path, the side-band communication path is separate from the first bus;
retrieving, by the processor from the memory, a key entry corresponding to the received key identifier value and the thread owner associated with the retrieved key entry;
responsive to the received thread owner value corresponding the thread owner associated with the retrieved key, executing a cryptography operation using the cryptography key associated with the retrieved key entry.

9. The method of claim 8, wherein the thread identifier value corresponds to one of a plurality of execution threads under an operating system at the central processing unit.

10. The method of claim 8, further comprising:
storing the thread identifier in a register at the processor.

11. The method of claim 8, wherein retrieving a key entry corresponding to the received key identifier value and the thread owner associated with the retrieved key entry is performed over a second bus coupling the processor to the memory.

12. The method of claim 8, further comprising:
responsive to the received thread owner value not corresponding the thread owner associated with the retrieved key, issuing an error message from the processor to the central processing unit.

13. The method of claim 8, wherein the central processing unit comprises a plurality of processor cores;
and wherein the thread identifier corresponds to one of the plurality of processor cores executing a current execution thread.

* * * * *